US011373067B2

(12) United States Patent
Schulter et al.

(10) Patent No.: US 11,373,067 B2
(45) Date of Patent: Jun. 28, 2022

(54) PARAMETRIC TOP-VIEW REPRESENTATION OF SCENES

(71) Applicant: NEC Laboratories America, Inc., Princeton, NJ (US)

(72) Inventors: Samuel Schulter, Santa Clara, CA (US); Ziyan Wang, Pittsburgh, PA (US); Buyu Liu, Cupertino, CA (US); Manmohan Chandraker, Santa Clara, CA (US)

(73) Assignee: NEC Corporation

( * ) Notice: Subject to any disclaimer, the term of this patent is extended or adjusted under 35 U.S.C. 154(b) by 418 days.

(21) Appl. No.: 16/526,073

(22) Filed: Jul. 30, 2019

(65) Prior Publication Data

US 2020/0050900 A1    Feb. 13, 2020

Related U.S. Application Data

(60) Provisional application No. 62/717,055, filed on Aug. 10, 2018.

(51) Int. Cl.
*G06K 9/62* (2022.01)
*B60R 11/04* (2006.01)
(Continued)

(52) U.S. Cl.
CPC ............ *G06K 9/6277* (2013.01); *B60R 11/04* (2013.01); *G05D 1/0251* (2013.01); *G06N 3/02* (2013.01);
(Continued)

(58) Field of Classification Search
None
See application file for complete search history.

(56) References Cited

U.S. PATENT DOCUMENTS

2012/0087546 A1*  4/2012  Focke ...................... G06T 3/00
                                                              382/104
2016/0004916 A1    1/2016  Zheng et al.
(Continued)

FOREIGN PATENT DOCUMENTS

CN    110196056 A  *  9/2019  ............. G01C 21/32
CN    110428490 A  *  11/2019
(Continued)

OTHER PUBLICATIONS

Geiger, "3D Traffic Scene Understanding from Movable Platforms", PAMI, vol. 36, Issue 5, May 2014, pp. 1012-1025.
(Continued)

*Primary Examiner* — Mohammed Rachedine
(74) *Attorney, Agent, or Firm* — Joseph Kolodka

(57) ABSTRACT

A method for implementing parametric models for scene representation to improve autonomous task performance includes generating an initial map of a scene based on at least one image corresponding to a perspective view of the scene, the initial map including a non-parametric top-view representation of the scene, implementing a parametric model to obtain a scene element representation based on the initial map, the scene element representation providing a description of one or more scene elements of the scene and corresponding to an estimated semantic layout of the scene, identifying one or more predicted locations of the one or more scene elements by performing three-dimensional localization based on the at least one image, and obtaining an overlay for performing an autonomous task by placing the one or more scene elements with the one or more respective predicted locations onto the scene element representation.

17 Claims, 6 Drawing Sheets

(51) Int. Cl.
  *G05D 1/02*     (2020.01)
  *G06N 3/02*     (2006.01)
  *G06V 20/56*    (2022.01)
  *H04N 5/32*     (2006.01)
  *B60W 50/14*    (2020.01)
  *B60W 60/00*    (2020.01)
  *G06N 3/04*     (2006.01)
  *G06N 3/08*     (2006.01)
  *G06V 10/82*    (2022.01)
  *H04N 5/232*    (2006.01)

(52) U.S. Cl.
  CPC ......... *G06V 20/56* (2022.01); *H04N 5/23238* (2013.01); *B60R 2300/107* (2013.01); *G06T 2207/30252* (2013.01)

(56) References Cited

U.S. PATENT DOCUMENTS

| | | | | |
|---|---|---|---|---|
| 2018/0330615 | A1* | 11/2018 | Yamanaka | G08G 1/165 |
| 2019/0266772 | A1* | 8/2019  | Li       | G06T 11/60 |
| 2019/0289224 | A1* | 9/2019  | Gao      | H04N 5/2628 |
| 2021/0088648 | A1* | 3/2021  | Thiel    | G01S 13/931 |

FOREIGN PATENT DOCUMENTS

| | | | |
|---|---|---|---|
| KR | 10-2017-0103763 A | | 9/2017 |
| WO | WO-2010126879 A1 * | 11/2010 | ............ A01G 7/00 |

OTHER PUBLICATIONS

Schulter, "Learning to Look around Objects for Top-View Representations of Outdoor Scenes", ECCV, Mar. 2018, pp. 815-831.

Seff, "Learning from Maps: Visual Common Sense for Autonomous Driving", arXiv:1611.08583, Nov. 2016, 7 pages.

* cited by examiner

US 11,373,067 B2

PARAMETRIC TOP-VIEW REPRESENTATION OF SCENES

RELATED APPLICATION INFORMATION

This application claims priority to provisional application Ser. No. 62/717,055, filed on Aug. 10, 2018, incorporated by reference herein in its entirety.

BACKGROUND

Technical Field

The present invention relates to artificial intelligence, machine learning and computer vision, and more particularly to three-dimensional scene understand and parametric top-view representations of scenes.

Description of the Related Art

Visual completion can be needed for an intelligent agent to navigate and interact with the three-dimensional (3D) world. Tasks, including but not limited to, driving in urban scenes, a robot grasping objects on a cluttered desk, etc. can be performed based on innate reasoning about unseen regions. A top-view or bird's eye view (BEV) representation of the scene where occlusion relationships have been resolved can be useful in performing such tasks. The representation can provide a compact description of agents and scene elements with semantically and geometrically consistent relationships, which can be intuitive for human visualization and precise for autonomous decisions.

SUMMARY

According to an aspect of the present invention, a method for implementing parametric models for scene representation provided. The method includes generating an initial map of a scene based on at least one image corresponding to a perspective view of the scene. The initial map includes a non-parametric top-view representation of the scene. The method further includes implementing a parametric model to obtain a scene element representation based on the initial map. The scene element representation provides a description of one or more scene elements of the scene and corresponds to an estimated semantic layout of the scene. The method further includes identifying one or more predicted locations of the one or more scene elements by performing three-dimensional localization based on the at least one image, and obtaining an overlay for performing an autonomous task by placing the one or more scene elements with the one or more respective predicted locations onto the scene element representation.

In accordance with another embodiment of the present invention, a system for implementing parametric models for scene representation is provided. The system includes a memory device for storing program code and at least one processor device operatively coupled to the memory device. The at least one processor device is configured to execute program code stored on the memory device to generate an initial map of a scene based on at least one image corresponding to a perspective view of the scene. The initial map includes a non-parametric top-view representation of the scene. The at least one processor device is further configured to implement a parametric model to obtain a scene element representation based on the initial map. The scene element representation provides a description of one or more scene elements of the scene and corresponds to an estimated semantic layout of the scene. The at least one processor device is further configured to identify one or more predicted locations of the one or more scene elements by performing three-dimensional localization based on the at least one image, and obtain an overlay for performing an autonomous task by placing the one or more scene elements with the one or more respective predicted locations onto the scene element representation.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
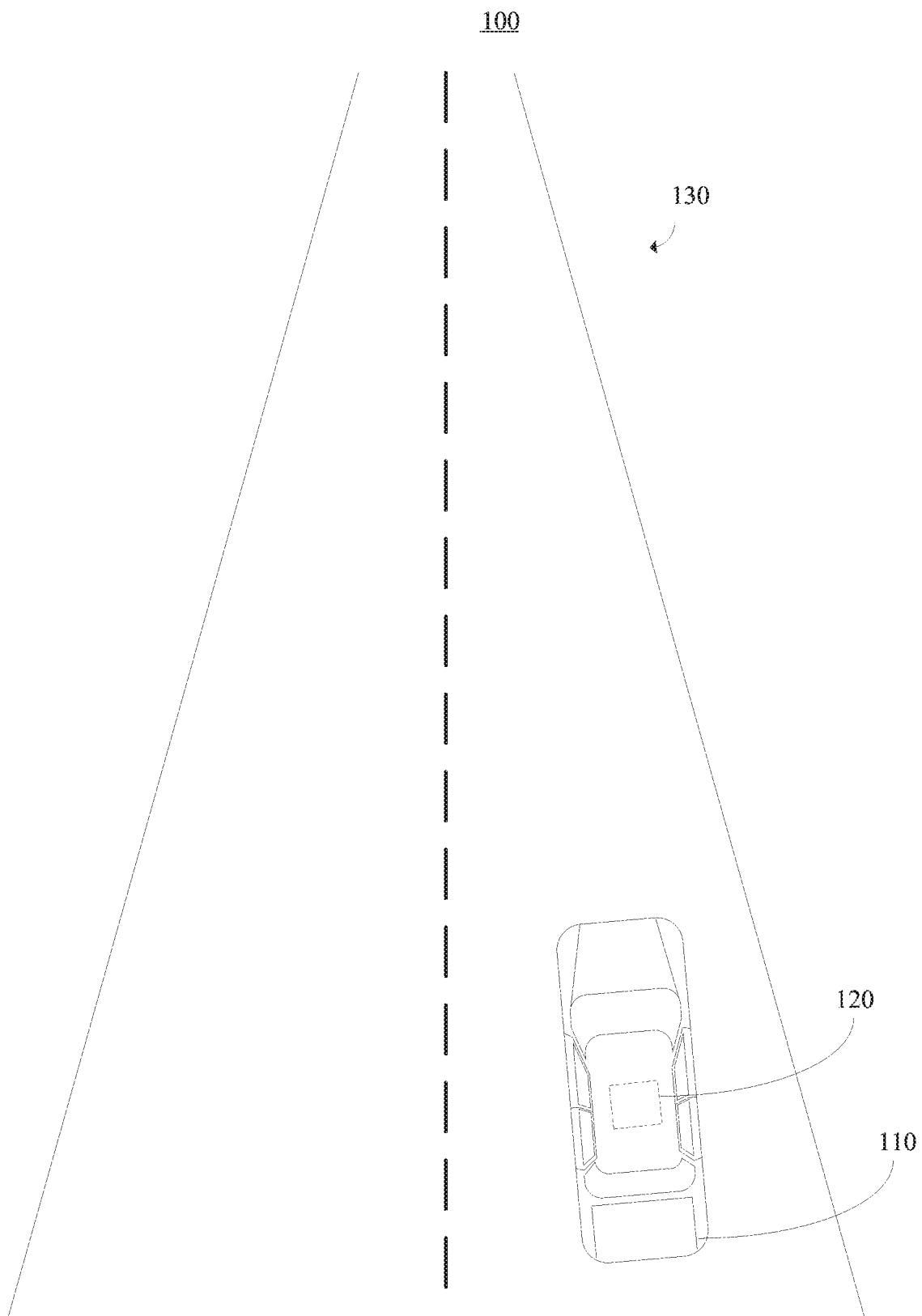
FIG. 1 is a block/flow diagram of a high-level overview of system implementing parametric models for scene representation to improve autonomous task performance, in accordance with an embodiment of the present invention.

The embodiments described herein can obtain (e.g., infer or predict) a parametric model that describes a scene by using an initial, non-parametric, bird's eye view (BEV) or top view representation or map, also referred to herein as an initial map, to compute a parametric representation of the scene. The parametric model can be richer than the non-parametric model by providing tangible descriptions of particular scene elements, thereby improving the ability of the model to be implemented by an intelligent agent within subsequent higher-level tasks. The embodiments described herein can use strong image-based features and can obtain the parametric model from a single red-green-blue (RBG) image or can be extended to multiple images (e.g., video sequences). For example, the scene parameters can be efficiently inferred from a monocular camera setup, from, e.g., a single RGB image or a video sequence. This can be accomplished by applying a convolutional neural network (CNN) that takes the initial map as input and predicts all parameters of the model (e.g., the scene attributes) based on the initial map. The parameters of the model can describe all attributes of the scene for building a schematic overview of the scene in the bird's eye view, which can significantly improve and simplify the performance of tasks such as, e.g., free-space estimation or path planning. Given these predictions, a graphical model can be built that refines the output and makes sure that (a) predicted parameters are feasible and (b), if the input is a video sequence, that the parameters are temporally consistent. Parts of the neural network in the system, as well as the graphical model, can be trained using simulated data and/or annotated data (e.g., data including human annotations).

More specifically, an input set of images can be processed by a convolutional neural network (CNN) to extract a feature representation. Given the feature representation, semantic segmentation can be applied to identify foreground objects in the scene. Then, regions in the feature representation that corresponds to foreground objects can be masked out, another CNN can be applied to perform occlusion-reasoning, and the semantics and geometry (e.g., depth) of regions behind foreground objects can be predicted. Using the occlusion-reasoning and the prediction, as well as the intrinsic calibration of the camera, the semantics can be mapped into the top-view.

In an illustrative embodiment, a parametric model that describes a driving scene (e.g., outdoor driving scene) can be inferred, which can be used by an intelligent agent to perform an autonomous task (e.g., autonomous driving task). Examples of such driving scenes can include, but are not limited to, highways, urban areas with complex intersections, etc. An image capturing device (e.g., camera) can be mounted on the vehicle to obtain a perspective view (not a top-view) of the scene. Foreground objects in the scene can include, but are not limited to, cars, pedestrians, traffic signs, poles, etc. The parameters of the model describe all attributes of the scene required to build a schematic overview of the driving scene in the bird's eye view, which, as mentioned above, can significantly improve and simplify tasks such as, e.g., free-space estimation or path planning. Such scene attributes can include, but are not limited to, number of lanes, existence of and distance to side roads, existence of and distance to crosswalks, existence of sidewalks on either side of the road, etc. Therefore, scene attributes of driving scenarios can be predicted from a single RGB image of the outdoor driving scene, without having to reliably extract OpenStreetMap (OSM) data. Accordingly, the embodiments described herein can improve the ability of an image processing system to implement complex scene representation.

Referring now in detail to the figures in which like numerals represent the same or similar elements and initially to FIG. 1, a block/flow diagram is provided illustrating a block/flow diagram of a high-level overview of an exemplary system 100 implementing parametric models for scene representation to improve autonomous task performance.

As shown, the system 100 includes a vehicle 110. In this illustrative embodiment, the vehicle 110 is depicted as a car. However, the vehicle 110 can be any suitable vehicle in accordance with the embodiments described herein.

As further shown, an image capturing device 120 can be positioned on the vehicle 110. In one embodiment, the image capturing device 120 includes a camera (e.g., monocular camera setup). As shown in this illustrative embodiment, the image capturing device 120 is mounted on the roof of the vehicle 110. However, the image capturing device 120 can be positioned in any suitable location on or inside of the vehicle 110, in accordance with the embodiments described herein.

The image capturing device 120 is configured to obtain still images and/or a video sequence associated with a perspective view of a scene 130. For example, the image capturing device 120 can be configured to capture red-green-blue (RGB) images of the scene. Additionally, although the scene 130 in FIG. 1 shows an empty road, the scene 130 can be any suitable driving scene in accordance with the embodiments described herein. Examples of such driving scenes can include, but are not limited to, highways, urban areas with complex intersections, etc. Moreover, foreground scene objects or elements of the scene 130 can include, but are not limited to, other cars, pedestrians, traffic signs, poles, etc.

As will be described in further detail below, the system 100 can be used to automatically "understand" the scene 130 by understanding layouts from a perspective view of the scene 130. Understanding the scene 130 includes inferring the parameters of the scene model, which can be applied to many concrete applications. One example of such an application is blind-spot reasoning, which can give warnings to the driver if areas of the scene 130 that need the driver's attention are occluded. For instance, a danger such as a truck that is occluding a sidewalk, a pedestrian crossing the road and may be visible to the driver very late, etc. can be automatically inferred by the system 100, and a soft warning can be triggered to alert the driver to the potential dangers. Another example is a situation where a large vehicle makes a left turn and occludes a potential oncoming car. If the driver also wants to make a left turn, a soft warning can be triggered.

The image capturing device 120 can be used to generate an initial representation or map of the scene can be generated based on at least one image associated with the scene 130. More specifically, the initial map can include a non-parametric top-view representation of the scene 130. The initial map can be then be used to implement a parametric model to obtain a scene element representation providing a description of one or more scene elements of the scene 130.

The parametric model can improve the ability of higher-level applications to perform operations based on a scene representation by permitting "naming" of scene elements. A distance can be assigned to these elements, and higher-level applications can then read out this information. For example, in the case of a complex driving scene, the parametric model can permit naming of scene elements like "sideroad" or "crosswalk at intersection." In contrast, in a non-parametric world, we could only say that a pixel in the top-view is k meters away and is labeled as, e.g., "crosswalk." However, a relation between pixels may not already exist. For instance, for pixels labeled as, e.g., "road," we do not know if a pixel belongs to the main road or to the sideroad. Additionally, the parametric model can be trained with a simulator, which only needs to render the semantics of the scene in the top-view and can be easily extended to attributes required for future tasks.

The scene element representation can correspond to an estimated semantic layout of the scene. One or more predicted locations of the one or more scene elements can be identified by performing three-dimensional localization based on the at least one image. Then, an overlay can be obtained by placing the one or more scene elements with the one or more respective predicted locations onto the scene element representation. The overlay can be obtained to perform one or more applications each associated with an autonomous task.

Although the illustrative embodiment of FIG. 1 is described within the context of a vehicle, the embodiments described herein can be applied to any system capable of implementing complex scene representations in the performance of autonomous tasks.

Figure 2:
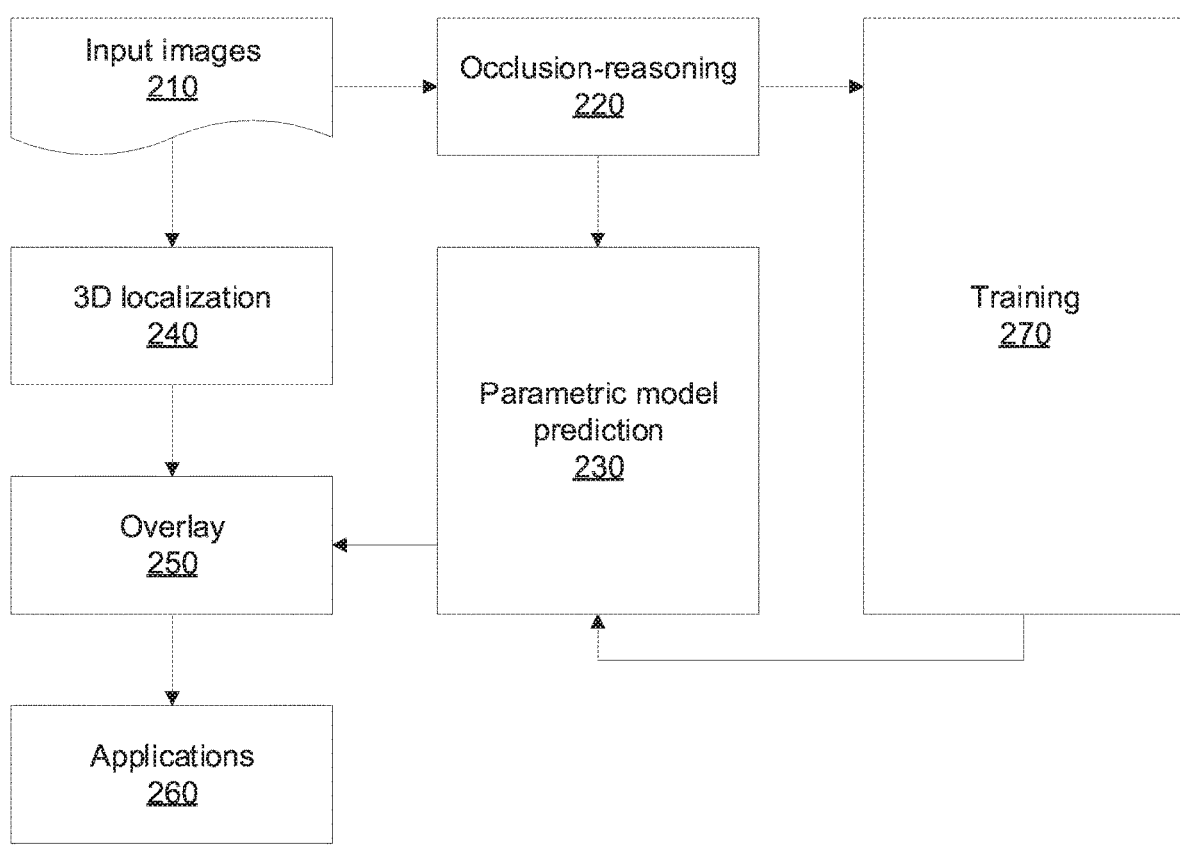
FIG. 2 is a block/flow diagram of a system/method for implementing parametric models for scene representation to improve autonomous task performance, in accordance with an embodiment the present invention.

With reference to FIG. 2, a block/flow diagram is provided illustrating a system/method 200 for implementing parametric models for scene representation. As will be described in further detail, the system/method 200 can be implemented within the system 100 to obtain parametric representations of a scene.

A set of input images 210 is obtained. The set of input images 210 can include, one or more single images and/or one or more frames of a video sequence. For example, the set of input images 210 can include one or more red-green-blue (RGB) images.

The set of input images 210 can be received by an occlusion-reasoning component 220. The occlusion-reasoning component 220 is configured to perform occlusion-reasoning and predict the semantics and geometry (e.g., depth) of regions behind foreground objects identified from the scene (e.g., cars, pedestrians, traffic signs, poles), and the occlusion-reasoned semantics and geometry can be used to generate an initial bird's eye view (BEV) or top view representation or map, referred to herein as an initial map. Further details regarding the occlusion-reasoning component 220 will be described below with reference to FIG. 3.

The initial map is a non-parametric representation, making it more difficult to use for subsequent higher-level tasks. To address these difficulties, a parametric representation of the scene can be computed from the initial map. More specifically, the initial map can be received by a parametric model prediction component 230 to predict each parameter of the parametric model. Further details regarding the parametric model prediction component 230 will be described below with reference to FIG. 4.

The set of input images 210 can also be received by three-dimensional (3D) localization component 240 to perform 3D localization of objects (e.g., monocular 3D localization). Given the set of input images 210, the 3D localization component 240 can implement an object detector. For example, in the illustrative embodiment of a driving scene, the object detector can detect traffic participants such as vehicles, pedestrians, traffic lights, traffic signs, etc. Any suitable object detection method can be used by the object detector in accordance with the embodiments described herein.

In an embodiment in which a video sequence is provided, a multi-target object tracker can be implemented to assign identities to objects over time. Then, a Structure from Motion (SFM)-based 3D localization of all objects can be implemented.

In an embodiment in which a single image is provided, pixel-wise depth can be estimated from just the single image using a monocular depth estimation model. Any suitable monocular depth estimation model can be used to estimate the pixel-wise depth in accordance with the embodiments described herein. Then, the estimated pixel-wise depth can be used to lift each object 3D bounding box (from the object detector) into the 3D world by relying on per-category priors on the object dimensions.

Outputs from the parametric model prediction component 230 and the 3D localization component 240 can be received by an overlay component 250. The overlay component 250 can place the scene objects and elements with their predicted location in the 3D world (from component 240) onto the estimated semantic layout of the scene (from component 230).

For example, in the illustrative embodiment of a driving scene, the traffic participants can be placed onto the estimated semantic layout of the scene. Since both the semantic layout and the 3D bounding boxes of the traffic participants are in the same metric space, they can be overlaid. Moreover, since the scene layout has a parametric form, each traffic participant can be assigned with more informative attributes about its position (e.g., "car 1 is driving on lane 3" or "pedestrian 5 is walking on crosswalk 2"). These attributes can be helpful for a set of applications 260. Further details regarding the set of applications 260 will be described below with reference to FIG. 5.

The system/method 200 can further include a training component 270. The training component 270 can train the network of the parametric model prediction component 230 based on the initial map output by the occlusion-reasoning component 220. The model can be trained with a simulator, which only needs to render the semantics of the scene in the top-view and which can be easily extended attributes needed for future tasks. Further details regarding the training component 270 will be described below with reference to FIG. 6.

Figure 3:
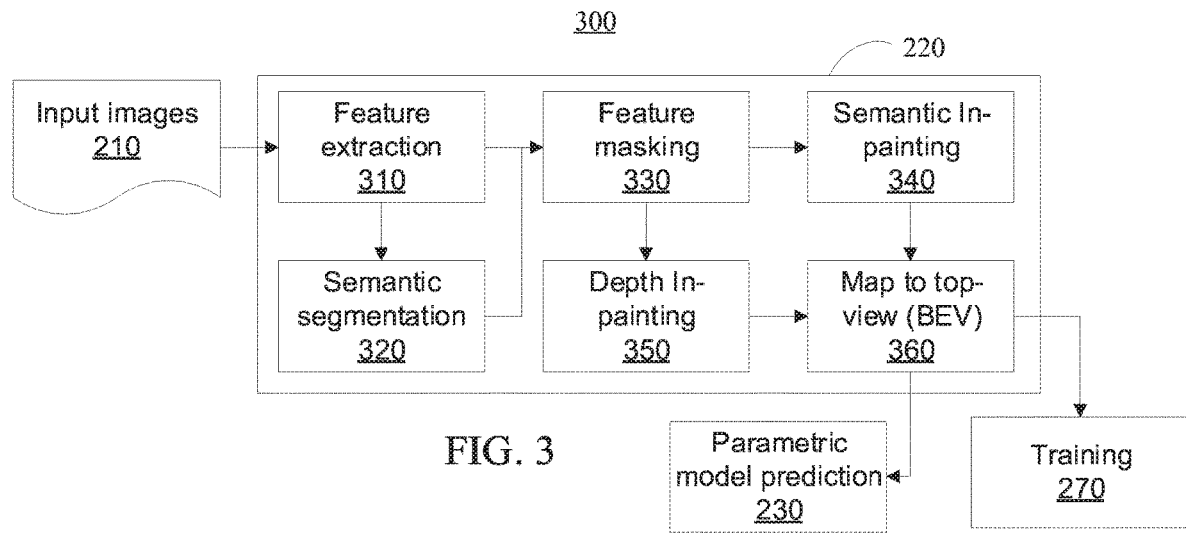
FIG. 3, is a block/flow diagram of a system/method for implementing occlusion-reasoning to generate an initial map within the system/method of FIG. 2, in accordance with an embodiment the present invention.

With reference to FIG. 3, a block/flow diagram is provided illustrating a system/method 300 for implementing occlusion-reasoning to generate an initial map. As shown, a set of initial images 210 is received by an occlusion-reasoning component 220, as described above with reference to FIG. 2.

More specifically, the occlusion-reasoning component 220 can include a feature extraction component 310, a semantic segmentation component 320, a feature masking component 330, a semantic in-painting component 340, a depth in-painting component 350, and a map to top-view (BEV) component 360.

The feature extraction component 310 can use a convolutional neural network (CNN) to extract a feature representation including one or more features (e.g., one or more spatial features) from an input image of the set of input images 210. At a lower resolution than the input image (e.g., 1/16), each pixel of an input image of the set of input images 210 can be represented by a D-dimensional feature vector. Any suitable CNN architecture can be used by the feature extraction component 310 to extract the feature representation from the input image. Examples of suitable CNN architectures include, but are not limited to, ResNet-101, ResNet-18, VGG-16, etc.

The semantic segmentation component 320 can predict a semantic category for each pixel of the input image based on the features extracted by the feature extraction component 310. Any suitable semantic segmentation architecture can be used by the semantic segmentation component 320 to predict the semantic category for each pixel of the input image in accordance with the embodiments described herein.

The feature masking component 330 can generate a masked feature representation (e.g., masked feature vector) based on an output of the semantic segmentation component 320. More specifically, the masked feature representation can be generated by masking "feature" pixels that are labeled as foreground objects by, in the feature vector example, setting the D-dimensional feature vector to all zeros. As used herein, foreground objects refer to categories that are not "flat" objects. In an illustrative embodiment in which the input image is a driving scene, "flat" objects can include, e.g., roads and sidewalks, and "not flat" objects can include, e.g., vehicles and pedestrians. Masking foreground objects on the feature-level can improve occlusion-reasoning speed as compared to masking foreground objects on the image-level (e.g., about twice as fast).

The semantic in-painting component 340 can predict background (or "flat") categories for all pixels of the input image (including the masked pixels), and the depth in-painting component 350 can predict the depth value for all pixels of the input image (including the masked pixels), based on the masked feature representation. Accordingly, the categories in the masked pixels can be in-painted or hallucinated by looking at the context information of the features.

The map to BEV component 350 can generate an initial (BEV) map by mapping each pixel (and thus its semantic label) to three-dimensions (3D) based on the predictions output by the components 340 and 350 and, in one embodiment, on an intrinsic camera calibration matrix. The intrinsic camera calibration matrix can be done manually. If a real intrinsic camera calibration is given, the output can be metrically correct as distances will be correct in the top-view map. Otherwise, the relations can be correct, but the absolute scale is incorrect. In any case, a top-view map can be generated. Then, a 3D point cloud from the top is observed and the height-axis is dropped. Overlapping pixels can be pooled (e.g., max-pooled) according to their respective semantic segmentation scores.

The initial map can include an array of size H×W×C, where H and W are spatial dimensions representing the height and width of the map in pixels, respectively, and C is the number of categories that are considered. The spatial dimensions are related to real-world coordinates (e.g., in meters). For example, a 30-meter-wide and 60-meter-long window can be considered, which can be mapped to a 128×256-dimensional array.

The initial map generated by the map to BEV component 350 can be received by a parametric model prediction component 230 and a training component 270, as described above with reference to FIG. 2 and as described in further detail below with reference to FIGS. 4 and 6.

Figure 4:
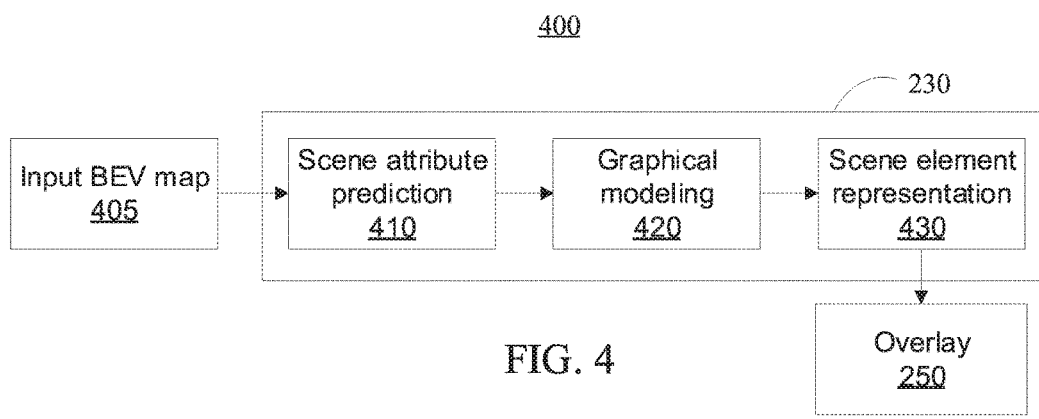
FIG. 4 is a block/flow diagram of a system/method for implementing parametric model prediction to predict each parameter of a parametric model within the system/method of FIG. 2, in accordance with an embodiment of the present invention.

With reference to FIG. 4, a block/flow diagram is provided illustrating a system/method 400 for implementing parametric model prediction to predict each parameter of the parametric model. As shown, an initial (BEV) map 405 is received by a parametric model prediction component 220, as described above with reference to FIG. 2.

More specifically, the parametric model prediction component 220 can include a scene attribute prediction component 410, a graphical modeling component 420, and a scene element representation component 430.

The scene attribute prediction component 410 can use another CNN to predict each scene attribute or parameter of the scene model based on the initial map 405. In the illustrative embodiment of a driving scene, examples of scene attributes or parameters that can be predicted include, but are not limited to, a number of lanes on a main road, a curvature of the main road, a distance to a side road from the main road, the existence of a crosswalk in the main road, etc. Some of the parameters can be discrete, while others can be continuous. The CNN can include a small feature extractor and several sub-networks for predicting the different types of parameters. The CNN can be trained in a supervised fashion using the training component 270 described above with reference to FIG. 2 and as further described below with reference to FIG. 6.

The graphical model component 420 can implement a graphical model that receives as input probabilities predicted for all of the scene attributes or parameters. The graphical model can ensure feasibility of the final scene representation. For example, in the illustrative embodiment of a driving scene, the graphical model can ensure that there is an intersection if there are crosswalks predicted on the left or on the right. Basically, the graphical model prevents the prediction of scene parameters that describe impossible scene layouts. Moreover, the graphical model can leverage information to improve the final accuracy based on a pair of attribute predictions. The graphical model can also be defined across subsequent frames (in time) to ensure temporal consistency of the scene representation. The parameters of the graphical model can be transformed into discrete variables (e.g., continuous parameters can be discretized) and an inference method can be applied to obtain an inference. For example, the inference method can be a belief propagation inference method, although any suitable inference method can be used in accordance with the embodiments described herein.

The scene element representation component 430 generates a scene element representation that provides a final scene description of the scene elements. For example, in the illustrative embodiment of a driving scene, the scene description of the scene elements can include background objects such as roads, lanes, crosswalks, sidewalks, intersections, etc. The scene element representation can serve as the basis for subsequent high-level applications, such as applications of the set of applications 260 described above with reference to FIG. 2 and as described in further detail below with reference to FIG. 5. It is noted that the predicted scene attributes can be sufficient to build a schematic overview of the scene, which, in a driving scene, can include, e.g., the topology of the road/intersection, the driving lanes, sidewalks and crosswalks. The scene element representation can be received by the overlay component 250, as described above with reference to FIG. 2.

Figure 5:
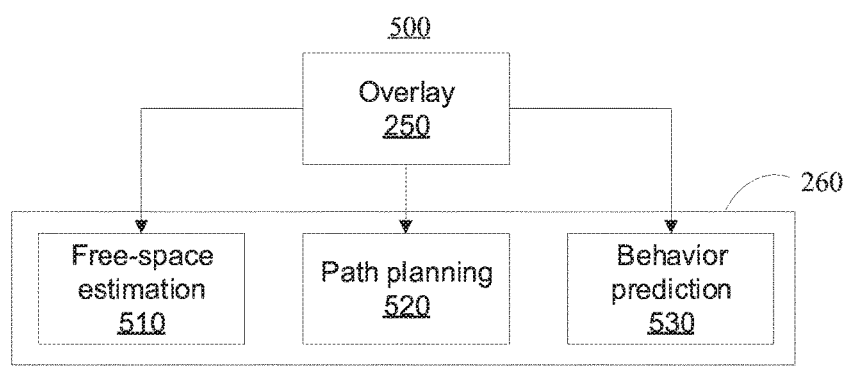
FIG. 5 is a block/flow diagram of a system/method for implementing an overlay within applications within the system/method of FIG. 2, in accordance with an embodiment the present invention.

With reference to FIG. 5, a block/flow diagram is provided illustrating a system/method 500 for implementing an overlay within applications. As shown, the overlay component 250, as described above with reference to FIG. 2, interacts with applications of the set of applications 260.

More specifically, the set of applications 260 can illustratively include, e.g., a free-space estimation application 510, a path planning application 520 and a behavior prediction application 530. The applications 510 through 530 can leverage the scene representation generated by the parametric model prediction component 230 described above with reference to FIGS. 2 and 4.

For example, in the illustrative embodiment of a driving scene, given attributes such as, e.g., the distance of a vehicle from a camera (e.g., via 3D localization component 240 as described above with reference to FIG. 2) and lane information (e.g., via a scene element representation generated by the parametric model prediction component 230 described above with reference to FIGS. 2 and 4), the free-space estimation application 510 can compute the free-space. Another example is path planning, where the parametric representation of the scene elements (e.g., intersections and crosswalks) can allow for generation of improved (e.g., safer) paths.

Figure 6:
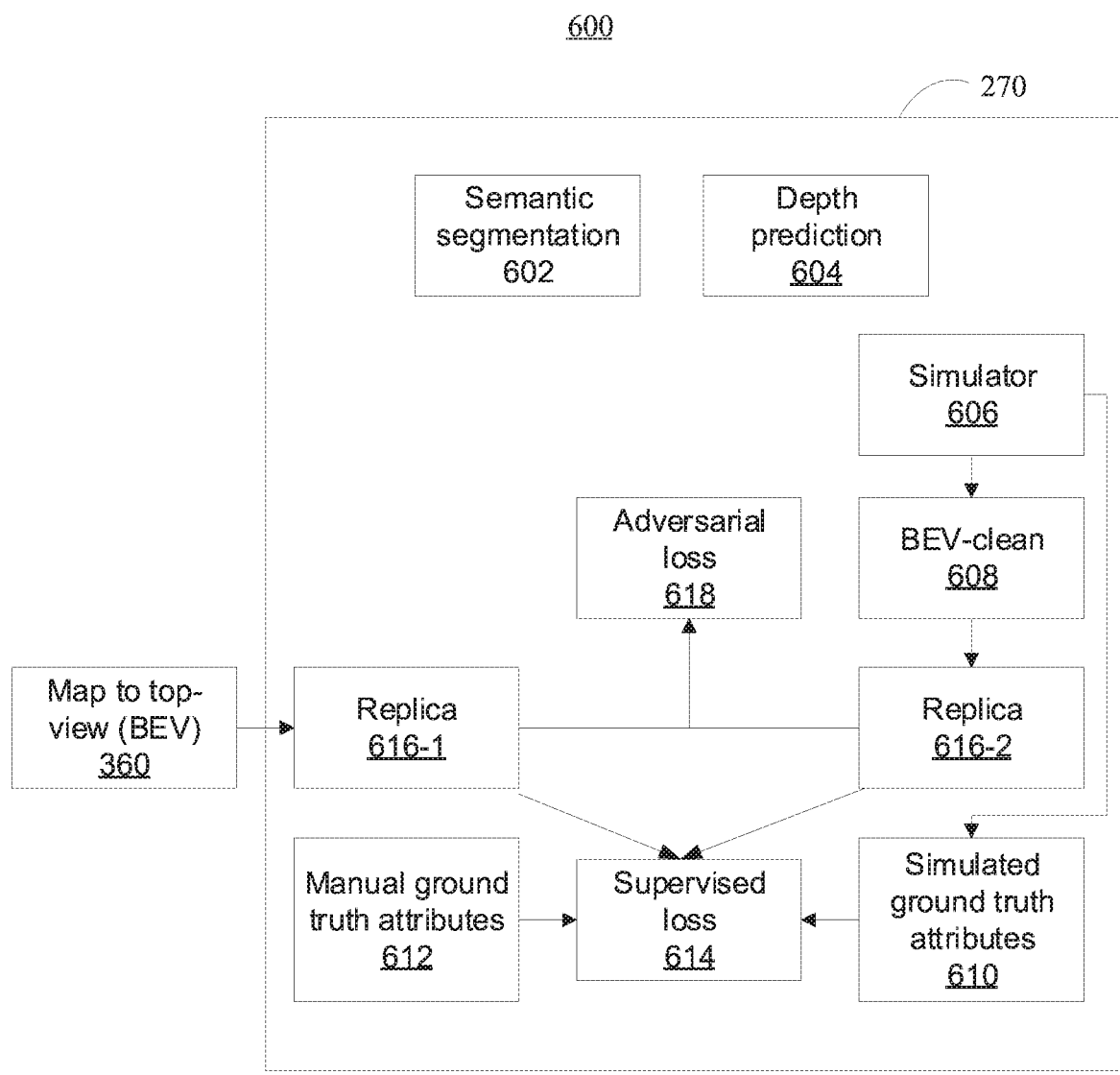
FIG. 6 is a block/flow diagram of a system/method for implementing training using a training component within the system/method of FIG. 2, in accordance with an embodiment of the present invention.

With reference to FIG. 6, a block/flow diagram is provided illustrating a system/method 600 for implementing training using a training component 270, as described above with reference to FIG. 2.

The training component 270 includes a semantic segmentation component 602 that can use semantic segmentation ground truth data to train the occlusion-reasoning component 220 described above with reference to FIGS. 2-3. More specifically, the semantic segmentation component 602 can use semantic segmentation ground truth data to train semantic segmentation performed by the semantic segmentation component 320 and/or semantic in-painting performed by the semantic in-painting component 340 described above with reference to FIG. 3. The semantic segmentation and/or semantic in-painting can be trained using any suitable training protocols in accordance with the embodiments described herein. For example, the semantic segmentation can be trained using a cross-entropy loss function. The semantic in-painting can be trained using the same cross-entropy loss function as the semantic segmentation, but does not have ground truth available at pixels covered by foreground objects because the semantics for occluded areas are unknown. By artificially adding random occluders to simulate foreground objects (e.g., by setting random patches of the feature map to zero) and thus obtain ground truth knowledge, supervised losses can be used to train the semantic in-painting.

The training component 270 further includes a depth prediction component 604 that can generate a depth prediction from an image by leveraging one or more depth maps. The one or more depth maps can be provided by, e.g., a laser scanner and/or a stereo camera setup. The depth prediction can be used for training, e.g., depth in-painting performed by the depth in-painting component 350 described above with reference to FIG. 3 and/or 3D localization (e.g., monocular 3D localization) performed by the 3D localization component 240 described above with reference to FIG. 2. For depth prediction (e.g., monocular depth prediction) training, plain regression loss functions can be used. For example, a Least Absolute Deviation loss function (e.g., L1 loss function) and/or a Least Square Error loss function (e.g., L2 loss function) can be used. The depth in-painting training can be performed using a training protocol similar to that described above with reference to the semantic in-painting training.

The training component 270 can further includes a simulator in bird's eye view (BEV) component ("simulator") 606. The simulator 606 can be implemented as a generative graphical model with all desired scene attributes or parameters for modeling as nodes. Examples of these nodes in the context of driving scenes include, but are not limited to, the number of lanes, the ego-lane (e.g., on which lane is the ego-car driving), the existence and distance to intersections, the existence of sidewalks, etc. Ancestral sampling can be used by the simulator 606 to obtain a sample of parameters or scene attributes from the model. These attributes can (fully) describe a scene and serve as the ground truth for training the CNN to predict scene attributes using the scene attribute prediction component 410 of FIG. 4.

Given the scene parameters, the simulator 606 can also render the semantics of the scene in a top-view in the form of a simulated BEV-clean sample, BEV-clean 608. BEV-clean 608 can describe the output of a rendering function of the simulator 606. BEV-clean 608 can correspond to a 3D tensor with shape H×W×C, where H and W describe the spatial resolution of the map and C refers to the number of handled semantic categories. The spatial resolution is typically set to 256×128 pixels, respectively corresponding to 60 meters and 30 meters in real space. The categories handled by the simulator in the context of driving scenes can include, but are noted limited to, roads, sidewalks, lane boundaries and crosswalks, such that C=4. However, the categories can be extended to other categories in alternative embodiments depending on category requirements.

The simulator 606 further generates simulated ground truth attributes 610. The simulated ground truth attributes 610 include scene attributes or parameters that are sampled from the simulator 606 and used to render BEV-clean 608. That is, the simulated ground truth attributes 610 correspond to the rendered images of BEV-clean 608. Thus, BEV-clean 608 and the simulated ground truth attributes 610 constitute simulated training data for a parametric model, such as the parametric model predicted by parametric model prediction component 230 of FIGS. 2 and 4. BEV-clean 608 and the simulated ground truth attributes 610 can be generated purely by simulation, with no human annotation effort being necessary.

In addition to generating the simulated training data (e.g., BEV-clean 608 and ground truth attributes 610) to train the scene attribute prediction network, manual ground truth attributes 612 can further be obtained. The manual ground truth attributes 612 include manual annotations for "real" data (e.g., input images and initial maps). In this way, scene attribute prediction can be trained from simulated data, real data, or a combination thereof.

The training component 270 can further include a supervised loss component 614. The supervised loss component 614 can use simulated training data including BEV-clean 608 and the simulated ground truth attributes 610, as well as real data including the manual ground truth attributes 610 and the initial (BEV) map, to train a scene attribute prediction component (e.g., the scene attribute prediction component 410 of FIG. 4) by imposing classification and regression loss functions, depending on the type of the scene attribute.

To describe the training process of the scene attribute prediction component, replicas of the model, including replicas 616-1 and 616-2, are shown. One of the replicas 616-1 and 616-2 sees real data including the BEV map output by the map to top-view (BEV) component 360 of FIG. 3, and the other of the replicas 616-1 and 616-2 sees simulated data including BEV-clean 608. In this illustrative example, the replica 616-1 sees the real data, and the replica 616-2 sees the simulated data.

The supervised loss component 614 can include a neural network having learnable weights. The replicas 616-1 and 616-2 and the original model can share the same weights, which can be updated during the training process.

As mentioned above, a goal of the embodiments described herein is to predict scene attributes for a given input image, which takes as input an estimated semantic top-view or BEV map (e.g., the BEV map output by the map to top-view (BEV) component 360 of FIG. 3). This real BEV map can be noisy and, thus, different to the ideal simulated output that the simulator 606 provides in the form of BEV-clean 608.

To address this, the training component 270 further includes an adversarial loss component 618. The adversarial loss component 618 can perform domain adaptation by aligning internal feature representations of the data in the replicas 616-1 and 616-2. The adversarial loss component 618 thus acts on internal features of the scene attribute prediction component 410 and encourages the internal features to be similar in distribution, regardless of whether the input is simulated or real.

The main challenge in aligning the feature representations is missing correspondence between any real sample (e.g., the BEV map output by the map to top-view (BEV) component 360 of FIG. 3) and any simulated sample (e.g., BEV-clean 608). To address this challenge, an adversarial loss function is used that includes a discriminator network, which can include a neural network that acts as a discriminator. Note that the discriminator network takes as input the internal representation of the scene attribute prediction component 410 for either real data (e.g., the BEV map output by the map to top-view (BEV) component 360 of FIG. 3) or simulated data (e.g., BEV-clean 608). The discriminator network can be trained to distinguish between the real sample and the simulated sample. That is, the task is a classification of two labels, "real" (system output) and "fake" (simulator). The discriminator network can act as a loss function for aligning the feature representations (domain adaptation) by setting the objective to maximize the score of the class for real data (e.g., system output) even though data from the simulator 606 is provided as input. Accordingly, the objective is to "fool" the discriminator network by making the simulated data (e.g., BEV-clean 608) look like real data (e.g., the BEV map output by the map to top-view (BEV) component 360 of FIG. 3).

The training procedure performed by the adversarial loss component 618 is useful for training the scene parameter prediction component 410 from simulated data, without the need for human annotation. Thus, structured noise that resembles real noise can be predicted.

Figure 7:
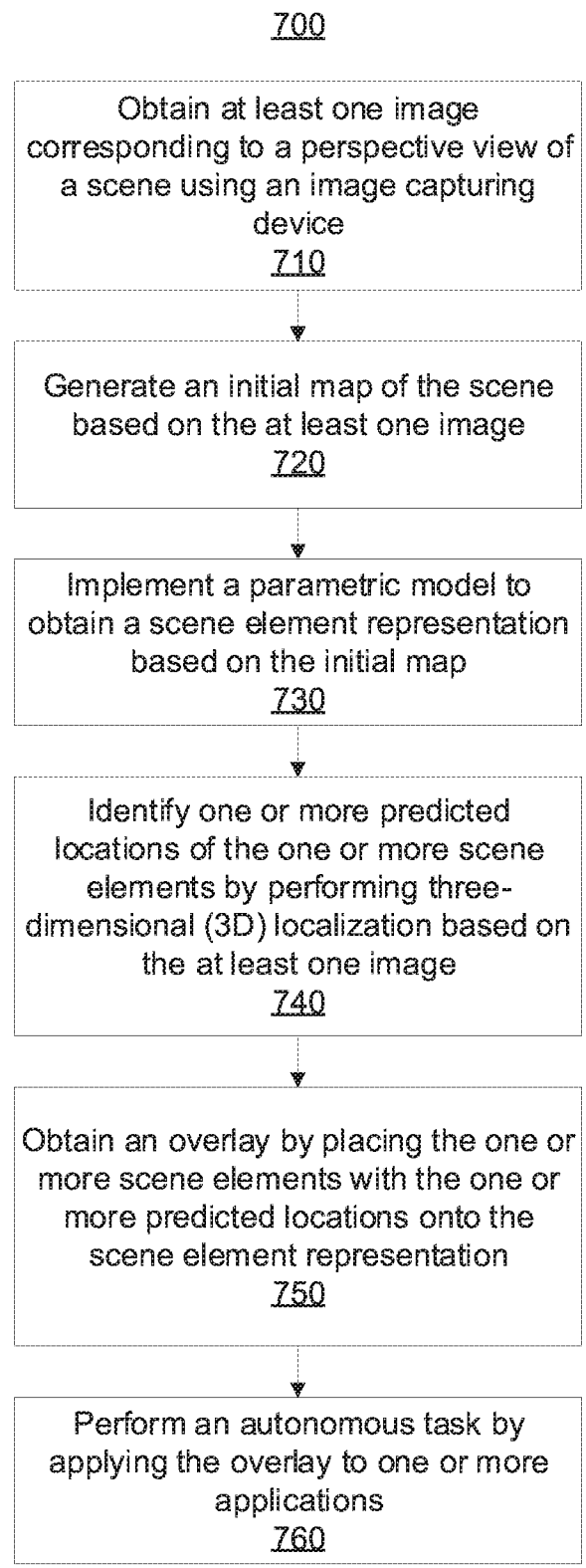
FIG. 7 is a block/flow diagram illustrating a system/method for implementing parametric models for scene representation to improve autonomous task performance, in accordance with an embodiment of the present invention.

With reference to FIG. 7, a block/flow diagram is provided illustrating a system/method 700 for implementing parametric models for scene representation to improve autonomous task performance. The parameters of the model can describe the scene attributes or parameters needed to build a schematic overview of the scene in the top or bird's eye view, which can significantly ease tasks like, e.g., free-space estimation and path planning. In an embodiment in which the scene is a driving scene, the scene attributes can include, but are not limited to, the number of lanes, existence of and distance to sideroads, existence of and distance to crosswalks, existence of sidewalks on either side of the road, etc.

At block 710, at least one image corresponding to a perspective view of the scene is obtained using an image capturing device. In one embodiment, the image capturing device includes a camera (e.g., a monocular camera setup). The image capturing device can be configured to capture still images and/or video sequences. For example, the image capturing device can be configured to capture red-green-blue (RGB) images. The image capturing device can, in an illustrative embodiment, be positioned or mounted on a vehicle such that the at least one image includes a perspective view of the driving scene.

At block 720, an initial map of the scene can be generated based on the at least one image. The initial map corresponds to an initial bird's eye view (BEV) or top view non-parametric representation or map. Due to the non-parametric representation, the initial map is more difficult to use with respect to subsequent higher-level tasks.

Generating the initial map can include performing occlusion-reasoning. For example, performing occlusion-reasoning can include extracting a feature representation from the at least one image. A convolutional neural network (CNN) can be used to extract a feature representation including one or more features (e.g., one or more spatial features) from the at least one image. At a lower resolution than the input image (e.g., 1/16), each pixel of the at least one image can be represented by a D-dimensional feature vector. Any suitable CNN architecture can be used extract the feature representation from the at least one image. Examples of suitable CNN architectures include, but are not limited to, ResNet-101, ResNet-18, VGG-16, etc.

Performing occlusion-reasoning can further include performing semantic segmentation to obtain a semantic category for each of a plurality of pixels of the at least one image based on the feature representation. Any suitable semantic segmentation architecture can be used to predict the semantic category for each pixel of the input image in accordance with the embodiments described herein.

Performing occlusion-reasoning can further include generating a masked feature representation based on the semantic segmentation. Generating the masked feature representation can include masking out one or more regions corresponding to one or more foreground objects identified in the scene. More specifically, the masked feature representation can be generated by masking "feature" pixels that are labeled as foreground objects by, in the feature vector example, setting the D-dimensional feature vector to all zeros. As used herein, foreground objects refer to categories that are not "flat" objects. In an illustrative embodiment in which the input image is a driving scene, "flat" objects can include, e.g., roads and sidewalks, and "not flat" objects can include, e.g., vehicles and pedestrians. Masking foreground objects on the feature-level can improve occlusion-reasoning speed as compared to masking foreground objects on the image-level (e.g., about twice as fast).

Performing occlusion-reasoning can further include predicting a background category and a depth value for each of the plurality of pixels based on the masked feature representation. For example, semantic in-painting can predict background (or "flat") categories for all pixels of the input image (including the masked pixels), and depth in-painting component can predict the depth value for all pixels of the input image (including the masked pixels), based on the masked feature representation. Accordingly, the categories in the masked pixels can be in-painted or hallucinated by looking at the context information of the features.

Performing occlusion-reasoning can further include mapping each of the plurality of pixels to three-dimensions (3D) based on the background categories and the depth values to generate the initial map. Mapping each of the plurality of pixels to 3D can include using an intrinsic calibration of the image capturing device (e.g., intrinsic calibration matrix). A 3D point cloud from the top is observed and the height-axis is dropped. Overlapping pixels can be pooled (e.g., max-pooled) according to their respective semantic segmentation scores. The initial map can include an array of size H×W×C, where H and W are spatial dimensions representing the height and width of the map in pixels, respectively, and C is the number of categories that are considered. The spatial dimensions are related to real-world coordinates (e.g., in meters). For example, a 30-meter-wide and 60-meter-long window can be considered, which can be mapped to a 128×256-dimensional array.

At block 730, a parametric model can be implemented to obtain a scene element representation based on the initial map. Implementing the parametric model to obtain the scene element representation can include computing a parametric representation of the scene from the initial map. More specifically, each parameter of the parametric model can be predicted from the initial map. The parametric model addresses the above-noted difficulties of the non-parametric representation of the initial map.

Scene attribute prediction can be performed using a CNN to predict each scene attribute or parameter of the scene model based on the initial map. In the illustrative embodiment of a driving scene, examples of scene attributes or parameters that can be predicted include, but are not limited to, a number of lanes on a main road, a curvature of the main road, a distance to the left side of the road, the existence of a crosswalk in the main road, etc. Some of the parameters can be discrete, while others can be continuous. The CNN used to perform the scene attribute prediction can include a small feature extractor and several sub-networks for predicting the different types of parameters, and can be trained in a supervised fashion as described above with reference to FIG. 6.

Implementing the parametric model to obtain the scene element representation can further include implementing a graphical model to ensure feasibility of the scene element representation based on a probability corresponding to each of one or more scene parameters obtained from the initial map. The graphical model can receive, as input, probabilities predicted for all of the scene attributes or parameters. For example, in the illustrative embodiment of a driving scene, the graphical model can ensure that there is an intersection if there are crosswalks predicted on the left or on the right. Basically, the graphical model prevents the prediction of scene parameters that describe impossible scene layouts. Moreover, the graphical model can leverage information to improve the final accuracy based on a pair of attribute predictions. The graphical model can also be defined across subsequent frames (in time) to ensure temporal consistency of the scene representation. The parameters of the graphical model can be transformed into discrete variables (e.g., continuous parameters can be discretized) and an inference method can be applied to obtain an inference. For example, a belief propagation can be used for inference, although any suitable inference method can be used in accordance with the embodiments described herein.

The scene element representation provides a final scene description of the scene elements. For example, in the illustrative embodiment of a driving scene, the scene description of the scene elements can include background objects such as roads, lanes, crosswalks, sidewalks, intersections, etc. The scene element representation can serve as the basis for subsequent high-level applications. It is noted that the predicted scene attributes can be sufficient to build a schematic overview of the scene, which, in a driving scene, can include, e.g., the topology of the road/intersection, the driving lanes, sidewalks and crosswalks.

At block 740, one or more predicted locations of the one or more scene elements are identified by performing 3D localization based on the at least one image. For example, an object detector can be used to detect objects within the scene. In the illustrative embodiment of a driving scene, the object detector can detect traffic participants such as vehicles, pedestrians, traffic lights, traffic signs, etc. Any suitable object detection method can be used by the object detector in accordance with the embodiments described herein.

In an embodiment in which a video sequence is provided, a multi-target object tracker can be implemented to assign identifies to objects over time. Then, a Structure from Motion (SFM)-based 3D localization of all objects can be implemented.

In an embodiment in which a single image is provided, pixel-wise depth can be estimated from just the single image using a monocular depth estimation model. Any suitable monocular depth estimation model can be used to estimate the pixel-wise depth in accordance with the embodiments described herein. Then, the estimated pixel-wise depth can be used to lift each object bounding box (from the object detector) into the 3D word by relying on per-category priors.

At block 750, an overlay for performing an autonomous task is obtained by placing the one or more scene elements with the one or more respective predicted locations onto the scene element representation.

For example, in the illustrative embodiment of a driving scene, the traffic participants can be placed onto the estimated semantic layout of the scene. Since both the semantic layout and the bounding boxes of the traffic participants are in the same metric space, they can simply be overlaid. Moreover, since the scene layout has a parametric form, one can assign each TP more informative attributes about their position (e.g., "car 1 is driving on lane 3" or "pedestrian 5 is walking on crosswalk 2"). These attributes can be helpful for applications of a set of applications 260.

At block 760, an autonomous task is performed by applying overlay to one or more applications. The the one or more applications can include one or more of free-space estimation to compute free space, path planning for computation of distances, and behavior prediction. For example, in the illustrative embodiment of a driving scene, free-space estimation can be computed based on attributes such as, e.g., the distance of a vehicle from a camera and lane, the free-space estimation application 510 can compute the free-space. In path planning, a parametric representation of the scene elements (e.g., intersections and crosswalks) can allow for generation of improved (e.g., safer) paths. Another example of such an application is blind-spot reasoning, which gives warnings to the driver if areas of the scene that need the driver's attention are occluded. For instance, a danger such as a truck that is occluding a sidewalk, a pedestrian crossing the road and may be visible to the driver very late, etc. can be automatically inferred, and a soft warning can be triggered to alert the driver to the danger. Another example is a situation where a large vehicle makes a left turn and occludes a potential oncoming car. If the driver also wants to make a left turn, a soft warning can be triggered.

Further details regarding the system/method 700 are described above with reference to FIGS. 1-6.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
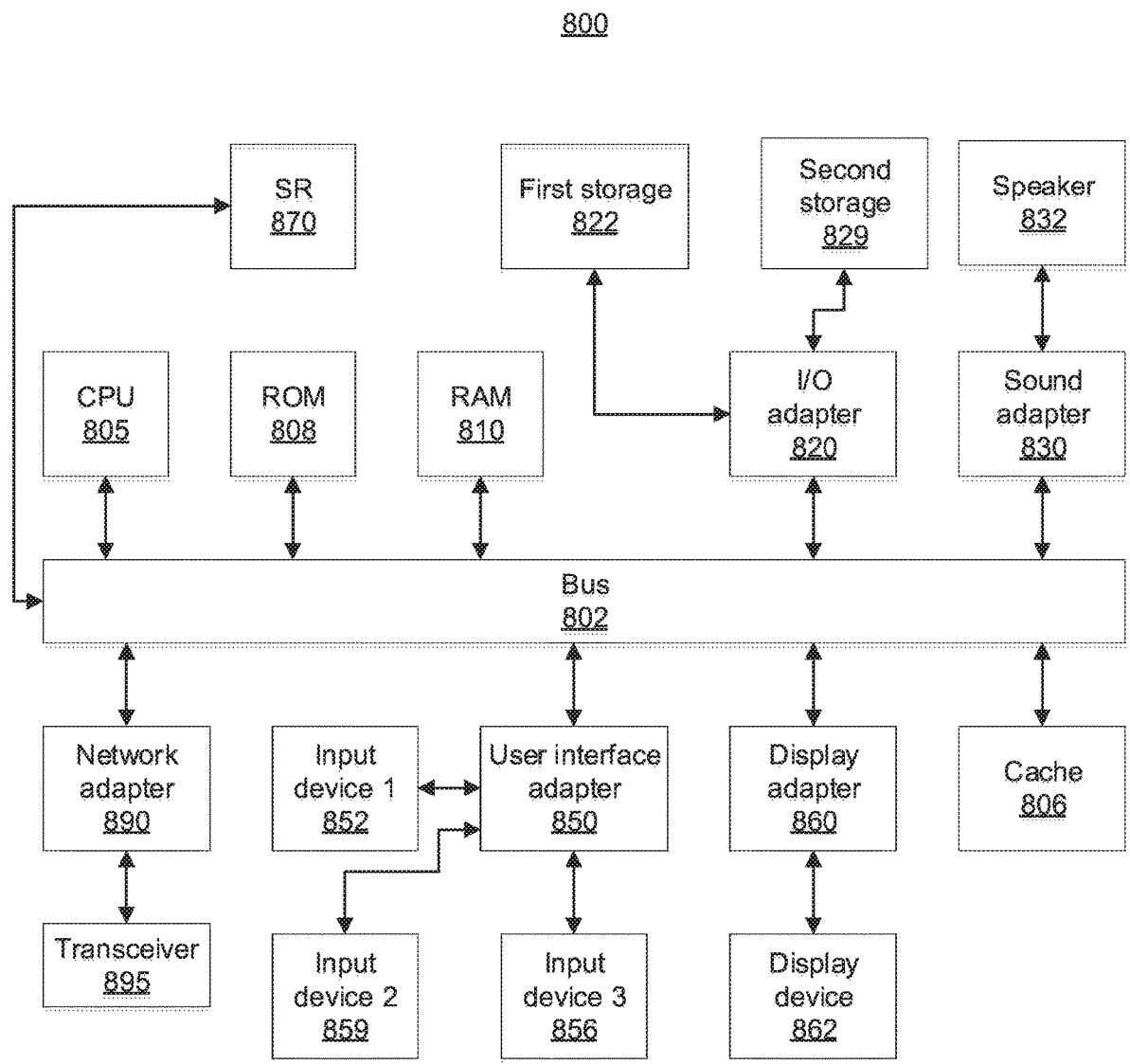
FIG. 8 is a block/flow diagram illustrating a computer system, in accordance with an embodiment the present invention.

Referring now to FIG. 8, an exemplary computer system 800 is shown which may represent a server or a network device, in accordance with an embodiment of the present invention. The computer system 800 includes at least one processor (CPU) 805 operatively coupled to other components via a system bus 802. A cache 806, a Read Only Memory (ROM) 808, a Random-Access Memory (RAM) 810, an input/output (I/O) adapter 820, a sound adapter 830, a network adapter 890, a user interface adapter 850, and a display adapter 860, are operatively coupled to the system bus 802.

A first storage device 822 and a second storage device 829 are operatively coupled to system bus 802 by the I/O adapter 820. The storage devices 822 and 829 can be any of a disk storage device (e.g., a magnetic or optical disk storage device), a solid state magnetic device, and so forth. The storage devices 822 and 829 can be the same type of storage device or different types of storage devices.

A speaker 832 may be operatively coupled to system bus 802 by the sound adapter 830. A transceiver 895 is operatively coupled to system bus 802 by network adapter 890. A display device 862 is operatively coupled to system bus 802 by display adapter 860.

A first user input device 852, a second user input device 859, and a third user input device 856 are operatively coupled to system bus 802 by user interface adapter 850. The user input devices 852, 859, and 856 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 852, 859, and 856 can be the same type of user input device or different types of user input devices. The user input devices 852, 859, and 856 are used to input and output information to and from system 800.

Scene representation (SR) component 870 may be operatively coupled to system bus 802. SR component 870 is configured to perform one or more of the operations described above. SR component 870 can be implemented as a standalone special purpose hardware device, or may be implemented as software stored on a storage device. In the embodiment in which SR component 870 is software-implemented, although shown as a separate component of the computer system 800, SR component 870 can be stored on, e.g., the first storage device 822 and/or the second storage device 829. Alternatively, SR component 870 can be stored on a separate storage device (not shown).

Of course, the computer system 800 may also include other elements (not shown), as readily contemplated by one of skill in the art, as well as omit certain elements. For example, various other input devices and/or output devices can be included in computer system 800, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 800 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for implementing parametric models for scene representation to improve autonomous task performance, comprising:
   generating an initial map of a scene based on at least one image corresponding to a perspective view of the scene, the initial map including a non-parametric top-view representation of the scene, the generating the initial map further includes performing occlusion-reasoning by:
      extracting a feature representation including one or more features from the at least one image;
      using semantic segmentation to obtain a semantic category for each of a plurality of pixels of the at least one image based on the feature representation;
      generating a masked feature representation based on the semantic segmentation, including masking out one or more regions corresponding to one or more foreground objects identified in the scene;
      predicting a background category and a depth value for each of the plurality of pixels based on the masked feature representation; and
      mapping each of the plurality of pixels to three-dimensions based on the background categories and the depth values to generate the initial map;
   implementing a parametric model to obtain a scene element representation based on the initial map, the scene element representation providing a description of one or more scene elements of the scene and corresponding to an estimated semantic layout of the scene;

identifying one or more predicted locations of the one or more scene elements by performing three-dimensional localization based on the at least one image; and obtaining an overlay for performing an autonomous task by placing the one or more scene elements with the one or more respective predicted locations onto the scene element representation.

2. The method of claim 1, further comprising obtaining the at least one image using an image capturing device, wherein mapping each of the plurality of pixels to three-dimensions further includes using an intrinsic calibration of the image capturing device.

3. The method of 2, wherein the image capturing device is mounted on a vehicle such that the at least one image includes a perspective view of a driving scene.

4. The method of claim 1, wherein implementing the parametric model to obtain the scene element representation further includes implementing a graphical model to ensure feasibility of the scene element representation based on a probability corresponding to each of one or more scene parameters obtained from the initial map.

5. The method of claim 1, further comprising performing the autonomous task by applying the overlay to one or more applications, wherein the one or more applications include one or more of free-space estimation to compute free space, path planning for computation of distances, and behavior prediction.

6. The method of claim 1, further comprising training the parametric model based on the initial map.

7. A computer program product comprising a non-transitory computer readable storage medium having program instructions embodied therewith, the program instructions executable by a computer to cause the computer to perform a method for implementing parametric models for scene representation to improve autonomous task performance, the method performed by the computer comprising:

generating an initial map of a scene based on at least one image corresponding to a perspective view of the scene, the initial map including a non-parametric top-view representation of the scene, the generating the initial map further includes performing occlusion-reasoning by:

extracting a feature representation including one or more features from the at least one image;

using semantic segmentation to obtain a semantic category for each of a plurality of pixels of the at least one image based on the feature representation;

generating a masked feature representation based on the semantic segmentation, including masking out one or more regions corresponding to one or more foreground objects identified in the scene;

predicting a background category and a depth value for each of the plurality of pixels based on the masked feature representation; and mapping each of the plurality of pixels to three-dimensions based on the background categories and the depth values to generate the initial map;

implementing a parametric model to obtain a scene element representation based on the initial map, the scene element representation providing a description of one or more scene elements of the scene and corresponding to an estimated semantic layout of the scene;

identifying one or more predicted locations of the one or more scene elements by performing three-dimensional localization based on the at least one image; and obtaining an overlay for performing an autonomous task by placing the one or more scene elements with the one or more respective predicted locations onto the scene element representation.

8. The computer program product of claim 7, wherein the method further includes obtaining the at least one image using an image capturing device, and wherein mapping each of the plurality of pixels to three-dimensions further includes using an intrinsic calibration of the image capturing device.

9. The computer program product of claim 8, wherein the image capturing device is mounted on a vehicle such that the at least one image includes a perspective view of a driving scene.

10. The computer program product of claim 7, wherein implementing the parametric model to obtain the scene element representation further includes implementing a graphical model to ensure feasibility of the scene element representation based on a probability corresponding to each of one or more scene parameters.

11. The computer program product of claim 7, wherein the method further includes performing the autonomous task by applying the overlay to one or more applications, wherein the one or more applications include one or more of free-space estimation to compute free space, path planning for computation of distances, and behavior prediction.

12. The computer program product of claim 7, wherein the method further includes training the parametric model based on the initial map.

13. A system for implementing parametric models for scene representation to improve autonomous task performance, comprising:

a memory device for storing program code; and at least one processor device operatively coupled to a memory device and configured to execute program code stored on the memory device to:

generate an initial map of a scene based on at least one image corresponding to a perspective view of the scene, the initial map including a non-parametric top-view representation of the scene, the initial map being generated by performing occlusion-reasoning by:

extracting a feature representation including one or more features from the at least one image;

using semantic segmentation to obtain a semantic category for each of a plurality of pixels of the at least one image based on the feature representation;

generating a masked feature representation based on the semantic segmentation, including masking out one or more regions corresponding to one or more foreground objects identified in the scene;

predicting a background category and a depth value for each of the plurality of pixels based on the masked feature representation; and mapping each of the plurality of pixels to three-dimensions based on the background categories and the depth values to generate the initial map;

implement a parametric model to obtain a scene element representation based on the initial map, the scene element representation providing a description of one or more scene elements of the scene and corresponding to an estimated semantic layout of the scene;

identify one or more predicted locations of the one or more scene elements by performing three-dimensional localization based on the at least one image; and obtain an overlay for performing an autonomous task by placing the one or more scene elements with the one or more respective predicted locations onto the scene element representation.

14. The system of claim 13, further comprising an image capturing device, wherein the at least one processor device is further configured to execute program code stored on the memory device to obtain the at least one image using the image capturing device, and wherein the at least one processor device is further configured to map each of the plurality of pixels to three-dimensions by using an intrinsic calibration of the image capturing device.

15. The system of claim 14, wherein the image capturing device is mounted on a vehicle such that the at least one image includes a perspective view of a driving scene.

16. The system of claim 13, wherein the at least once processor device is further configured to implement the parametric model to obtain the scene element representation by implementing a graphical model to ensure feasibility of the scene element representation based on a probability corresponding to each of one or more scene parameters.

17. The system of claim 13, wherein the at least one processor device is further configured to execute program code stored on the memory device to perform the autonomous task by applying the overlay to one or more applications, wherein the one or more applications include one or more of free-space estimation to compute free space, path planning for computation of distances, and behavior prediction.

* * * * *